United States Patent
Kirby

(10) Patent No.: US 8,230,772 B2
(45) Date of Patent: Jul. 31, 2012

(54) SPINDLE WITH HYDRAULIC PASSAGE ARRANGEMENT AND METHOD OF MANUFACTURE

(75) Inventor: Lane C. Kirby, Westpoint, IN (US)

(73) Assignee: Terra Drive Systems, Inc., Washington, DC (US)

( * ) Notice: Subject to any disclaimer, the term of this patent is extended or adjusted under 35 U.S.C. 154(b) by 818 days.

(21) Appl. No.: 12/381,093

(22) Filed: Mar. 5, 2009

(65) Prior Publication Data

US 2010/0225157 A1    Sep. 9, 2010

(51) Int. Cl.
*F01B 13/06* (2006.01)
*B60K 7/00* (2006.01)

(52) U.S. Cl. .............................. 91/487; 92/72
(58) Field of Classification Search ............ 91/487, 91/491; 92/72; 301/131
See application file for complete search history.

(56) References Cited

U.S. PATENT DOCUMENTS

| | | |
|---|---|---|
| 3,090,361 A | 5/1963 | Orshansky, Jr. |
| 3,439,766 A | 4/1969 | Dence et al. |
| 3,811,525 A | 5/1974 | Stuart |
| 3,824,899 A | 7/1974 | Dzioba |
| 3,940,159 A | 2/1976 | Pringle |
| 3,978,771 A | 9/1976 | Burnight et al. |
| 3,999,465 A | 12/1976 | Burnight |
| 4,021,690 A | 5/1977 | Burton |
| 4,140,196 A | 2/1979 | Brewer |
| 4,171,732 A | 10/1979 | Pinson |
| 4,244,184 A | 1/1981 | Baldauf et al. |
| 4,326,450 A | 4/1982 | Bacquie |
| 4,766,727 A | 8/1988 | Dull et al. |
| 4,913,258 A | 4/1990 | Sakurai et al. |
| 5,224,411 A | 7/1993 | Fillion |
| 6,367,572 B1 | 4/2002 | Maletschek et al. |
| 8,051,940 B2 * | 11/2011 | Ziech ........................ 180/253 |

* cited by examiner

*Primary Examiner* — Thomas E Lazo
(74) *Attorney, Agent, or Firm* — George Pappas

(57) ABSTRACT

A spindle body defining a central axis and having a hydraulic motor assembly operably mounted thereon. At least a portion of the hydraulic motor assembly is rotatable relative to the spindle body about the central axis. A plurality of hydraulic passages extend within the spindle body. Each of the passages includes axial and lateral sections. The axial sections are in fluid communication with the hydraulic motor assembly and define a first centerline extending substantially parallel with the central axis. Each of the lateral sections are in fluid communication with one of the axial sections and form a port on an outer surface of the spindle body. The lateral sections also each define a second centerline wherein the second centerlines are positioned in mutually parallel planes and each of the first centerlines and the central axis are substantially parallel with each of the mutually parallel planes. A method of manufacture is also disclosed.

20 Claims, 11 Drawing Sheets

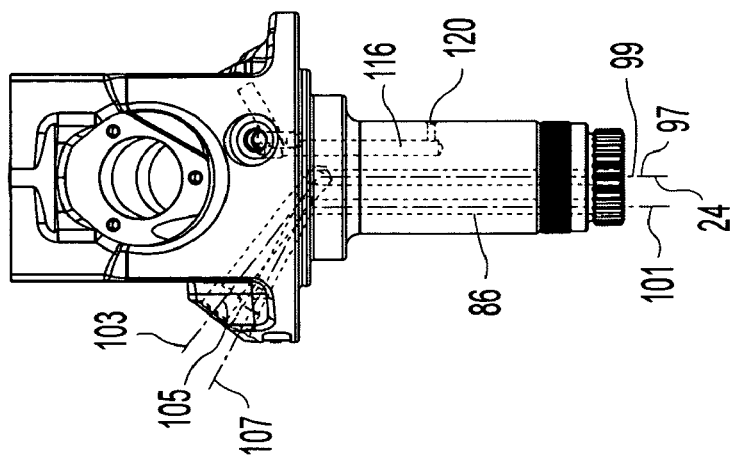
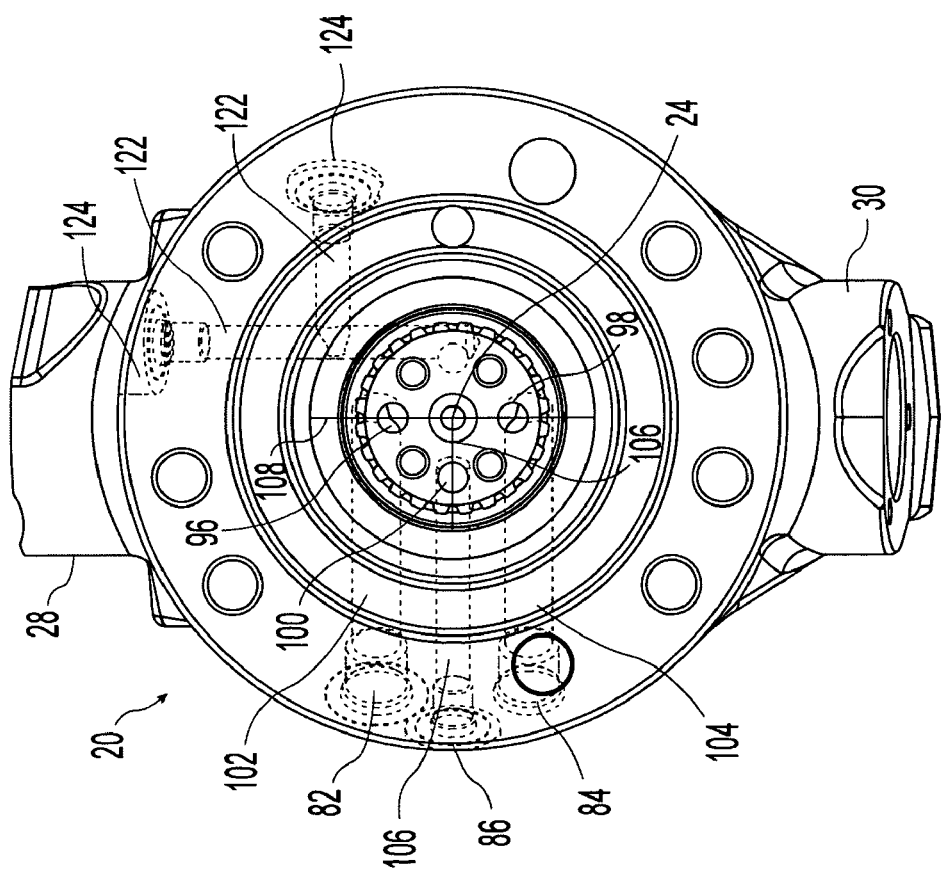
Fig. 17
Fig. 16

SPINDLE WITH HYDRAULIC PASSAGE ARRANGEMENT AND METHOD OF MANUFACTURE

BACKGROUND OF THE INVENTION

1. Field of the Invention

The present invention relates to hydraulic motor assemblies and, more particularly, to hydraulic motor assemblies mounted within a wheel and rotatably carried on a spindle.

2. Description of the Related Art

The mounting of a hydraulic motor within a wheel wherein the hydraulic motor is rotatably carried on a spindle is known in the art. Typically, such hydraulic motors drive the rotation of the wheel within which they are mounted when the motor is operating and allow the wheel to freely rotate when the motor is not providing a driving force. The spindle is often integrally formed with a knuckle that can be rotatably engaged with a vertically extending kingpin. The rotatable engagement of the knuckle and kingpin allow the wheel to be a steerable wheel.

Hydraulic fluid must be communicated to and from the hydraulic motor and hydraulic passages are typically formed in the spindle and knuckle to provide for this communication of hydraulic fluid. For example, it is known to provide a plurality of hydraulic passages in such an integrally formed knuckle and spindle wherein each of the passages includes both an axially extending section and a laterally extending section. The axially extending sections extend substantially parallel with the central axis defined by the spindle and have one end in communication with the hydraulic motor assembly. The opposite end of the axially extending sections are in communication with a corresponding one of the laterally extending sections. The laterally extending sections each extend laterally outwardly from the axially extending sections to a port located on the outer surface of the knuckle. These laterally extending sections of the hydraulic passages are arranged at differing angles without any of the laterally extending sections being arranged parallel with each other. This arrangement of the hydraulic passages, while effectively communicating hydraulic fluid to the hydraulic motor assembly, is relatively complex and expensive to manufacture.

SUMMARY OF THE INVENTION

The present invention provides a spindle body having a plurality hydraulic passages that are arranged in a manner that facilitates the efficient manufacture of the spindle body.

The invention comprises, in one form thereof, an apparatus that includes a spindle body defining a central axis and a hydraulic motor assembly operably mounted on the spindle. At least a portion of the hydraulic motor assembly is rotatable relative to the spindle body about the central axis. A plurality of hydraulic passages extend within the spindle body. Each of the plurality of passages includes an axial section and a lateral section. Each of the axial sections is in fluid communication with the hydraulic motor assembly and defines a first centerline extending substantially parallel with the central axis. Each of the lateral sections has a first end in fluid communication with a corresponding one of the axial sections and an opposite second end defining a port on an outer surface of the spindle body. Each of the lateral sections defines a second centerline wherein the second centerlines are positioned in mutually parallel planes and each of the first centerlines and the central axis are substantially parallel with each of the mutually parallel planes.

The invention comprises, in another form thereof, a method of manufacture that includes providing a spindle body wherein the spindle body defines a central axis and is adapted to support a hydraulic motor thereon. The method also includes forming a plurality of axially extending hydraulic passage sections in the spindle body wherein each of the axially extending sections defines a first centerline that is substantially parallel with the central axis and forming a corresponding plurality of laterally extending hydraulic passage sections. Each of the laterally extending sections has one end defining a port on an external surface of the spindle body and an opposite end in fluid communication with one of the axially extending sections. Each of the second laterally extending sections defines a second centerline wherein the second centerlines are positioned in mutually parallel planes and the first centerlines and the central axis are substantially parallel with each of the mutually parallel planes.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 16 is a front view of the spindle body showing the hydraulic passages.
FIG. 17 is a top schematic view of the hydraulic passages.

Figure 1:
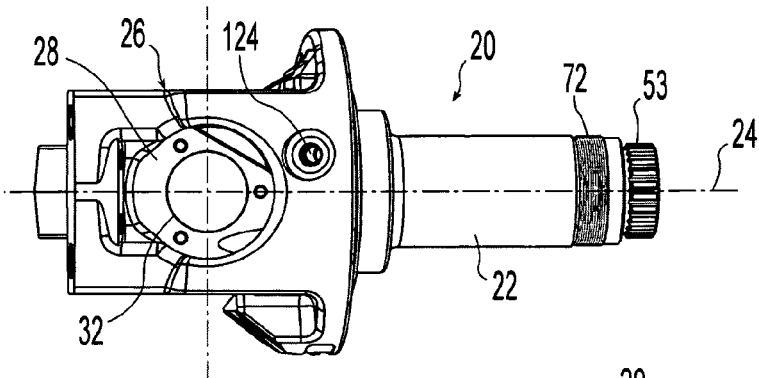
FIG. 1 is a top view of a spindle body.
Figure 2:
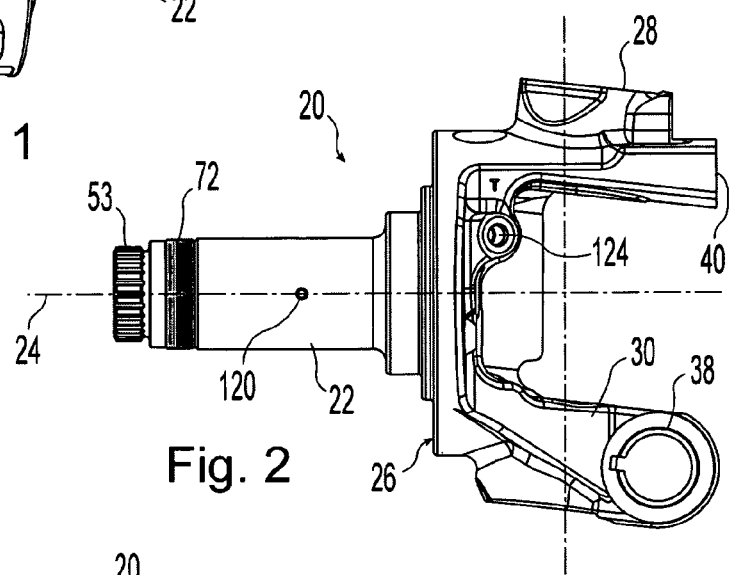
FIG. 2 is a side view of the spindle body.
Figure 3:
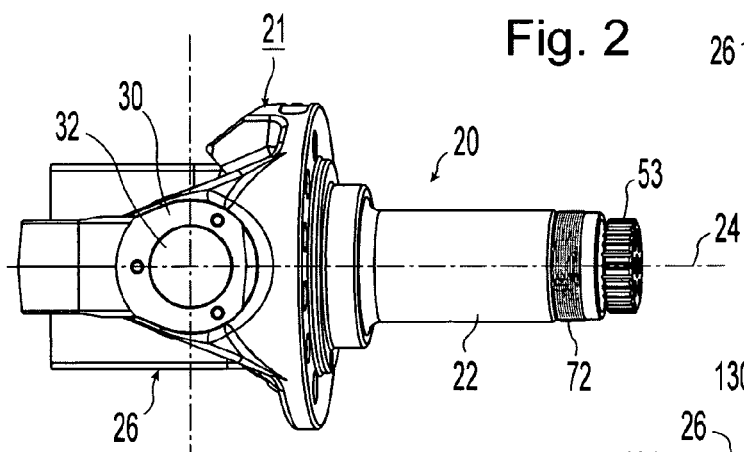
FIG. 3 is a bottom view of the spindle body.
Figure 4:
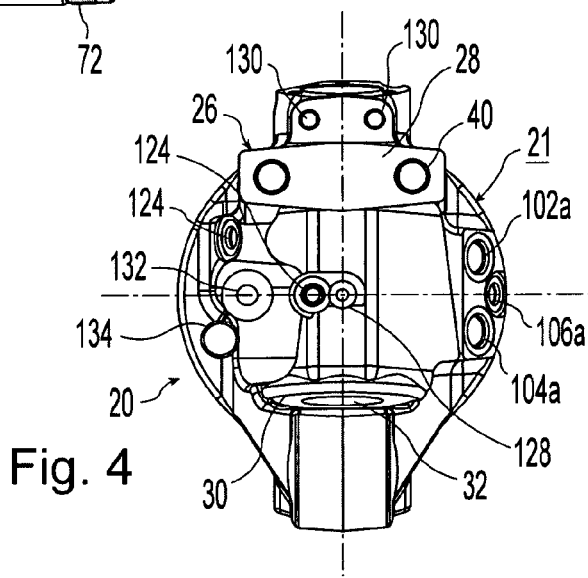
FIG. 4 is an end view of the spindle body.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 11:
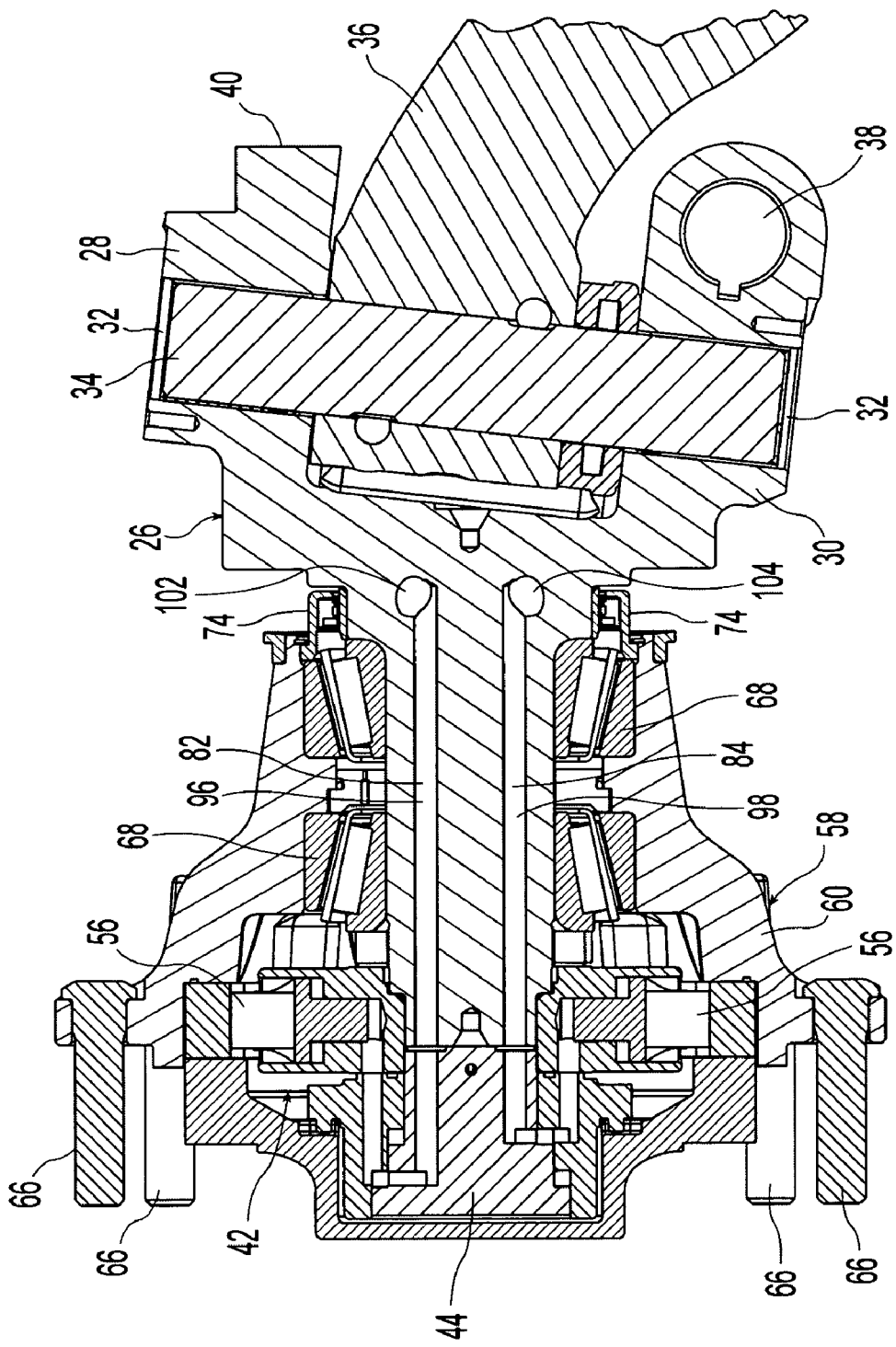
FIG. 11 is a cross sectional view of the spindle body, hydraulic motor assembly, hub assembly and vehicle structure.

A spindle body 20 is shown in FIGS. 1-8. Spindle body 20 includes a spindle shaft 22 defining a central axis 24 and a knuckle portion 26. Knuckle 26 includes an upper projection 28 and a lower projection 30 which have aligned bore holes 32 for rotatably receiving a king pin 34. King pin 34 rotatably secures spindle body 20 to a vehicle structure 36 (FIG. 11).

Knuckle 26 also defines a tie rod mounting bore 38. Spindle 20 is adapted to support a steerable wheel and includes holes on a mounting interface 40 for connecting knuckle 26 to a vehicle steering arm (not shown), bores 130 for mounting a hose guide bracket, a steering stop bore 132 and a bore 134 for receiving an ABS sensor. Mounting holes 126 (FIG. 8) are used to secure a brake assembly to spindle body 20.

A hydraulic motor assembly 42 is mounted on spindle shaft 22 (FIGS. 9-11 and 13). Hydraulic motor assembly 42 is a conventional hydraulic motor that can be mounted within a wheel hub. Motor assembly 42 includes a valve assembly 44 located at the distal end of spindle shaft 22, a cylinder block 46, camming pistons 48 and a cam ring 50. Holes 43 (FIG. 8) located on the distal end of shaft 22 are used to secure valve assembly 44 to shaft 22.

Cylinder block 46 is stationary relative to spindle shaft 22 and is secured thereto by the engagement of splines 52 located on cylinder block 46 with splines 53 located on shaft 22. Camming pistons 48 are mounted within piston bores 54 located in cylinder block 46 and have a rolling cam member 56 mounted on their projecting end. Rolling cam members 56 are engaged with cam ring 50 and drivingly rotate cam ring 50 during operation of hydraulic motor assembly 42. Cam ring 50 is, in turn, secured to wheel hub assembly 58 whereby operation of hydraulic motor 42 drivingly rotates wheel hub assembly 58 and the wheel (not shown) mounted thereon.

Figure 10:
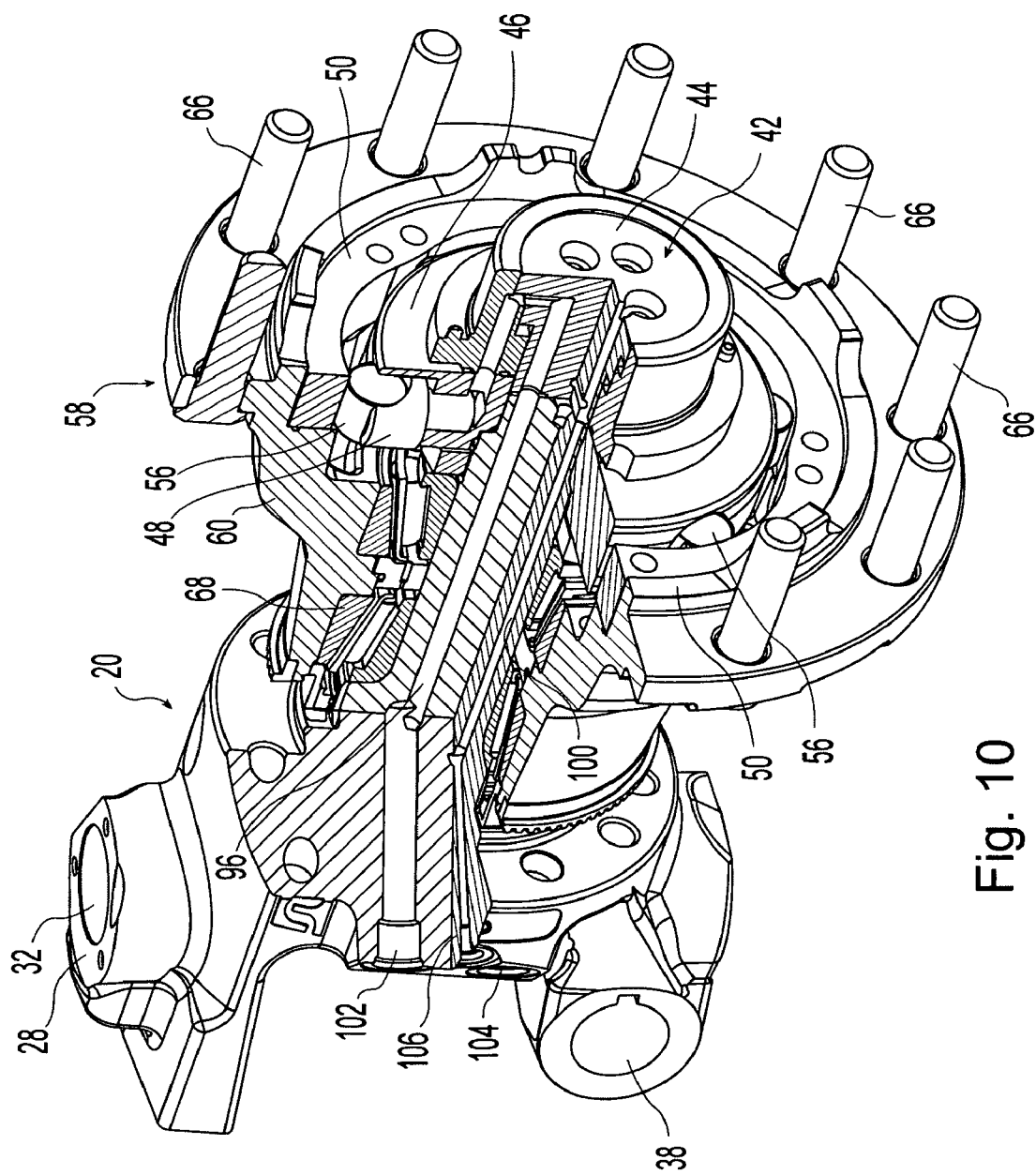
FIG. 10 is a cut-away perspective view of the spindle body, hydraulic motor assembly and hub assembly.
Figure 12:
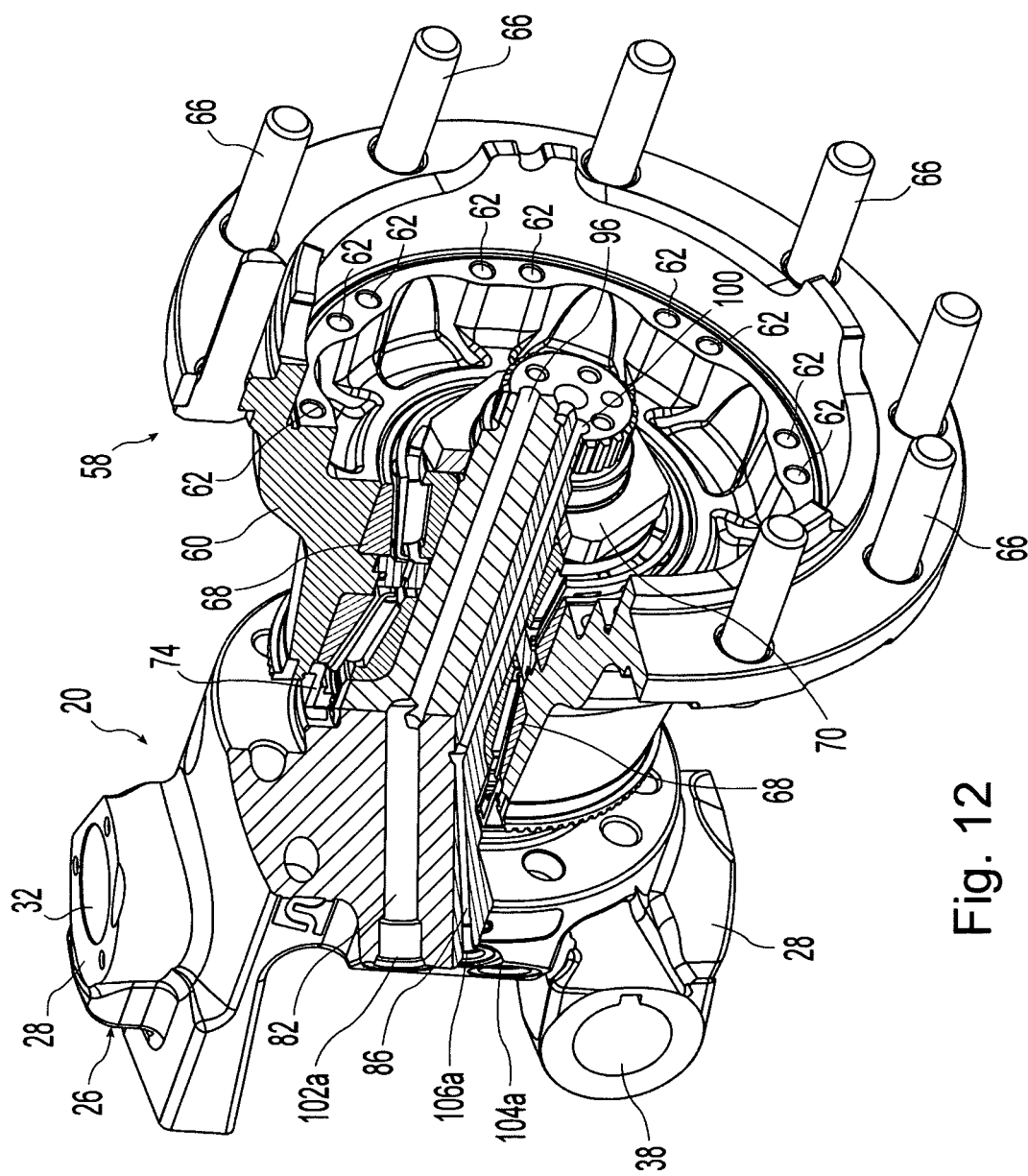
FIG. 12 is a cut-away perspective view of the spindle body and hub assembly.

Wheel hub assembly 58 is shown in FIGS. 10-12. FIG. 12 shows wheel hub assembly 58 mounted on spindle shaft 22 with hydraulic motor assembly 42 removed for purposes of graphical clarity. Wheel hub assembly 58 includes s hub 60 which is secured to cam ring 58. Fasteners are inserted through bores 62 in hub 60 and bores 64 in cam ring 50 to secure hub 60 to cam ring 50. Wheel mounting studs 66 extending through an outer radial flange on hub 60 are used to secure a wheel to hub assembly 58. A bearing assembly 68 rotatably supports hub 60 on spindle shaft 22. A retaining nut 70 (FIG. 12) is engaged with threads 72 on shaft 22 to retain bearing assembly 68 on shaft 22. An oil seal 74 is disposed between shaft 22 and hub 60 proximate bearing assembly 68 to prevent the loss of lubricating fluid for bearing assembly 68. Hydraulic motor 42 is located on the opposite side of bearing assembly 68 and hydraulic fluid seeping from motor 42 provides a source of lubricating fluid for bearing assembly 68.

Figure 13:
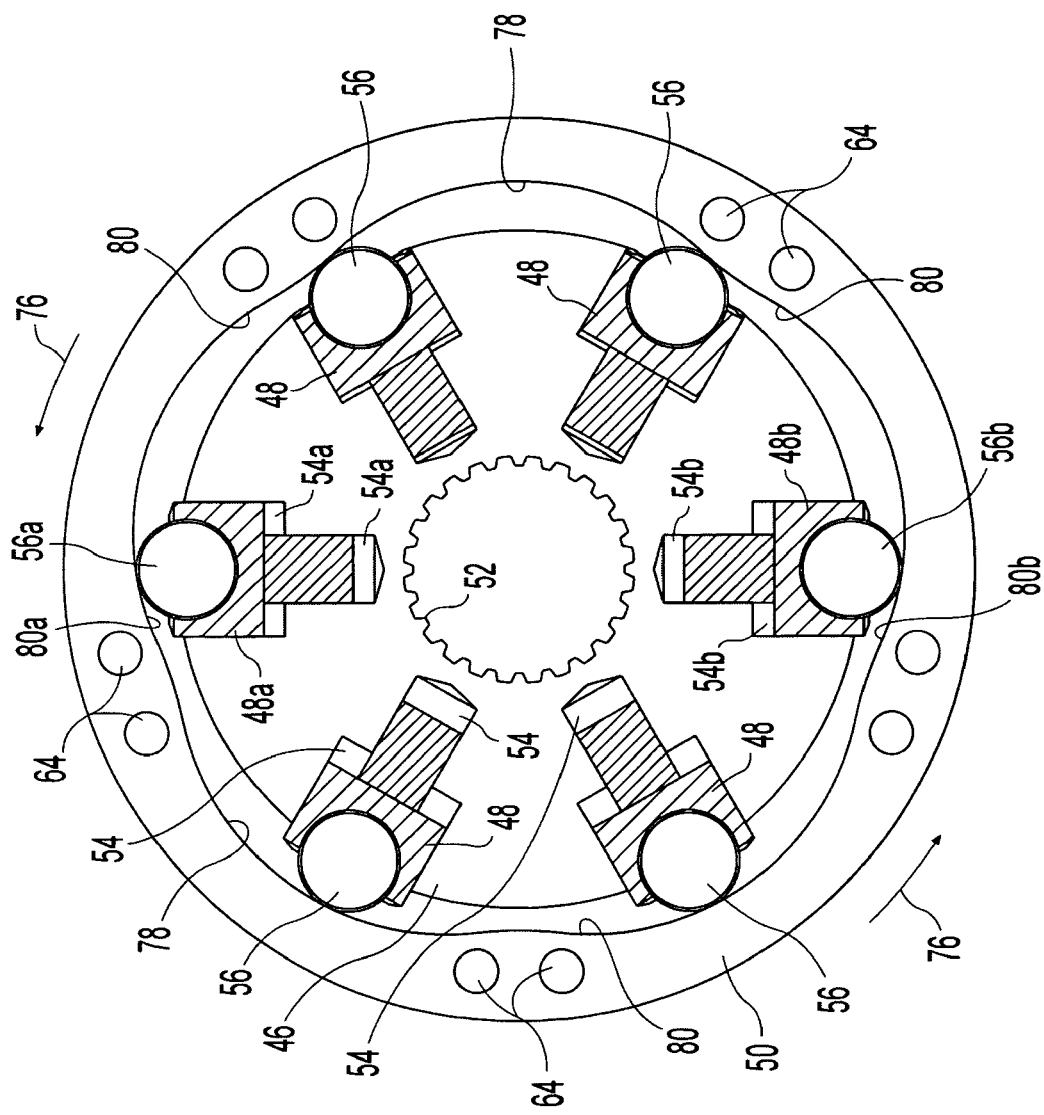
FIG. 13 is a schematic end view of the hydraulic motor assembly.

The operation of hydraulic motor 42 is best understood with reference to FIG. 13. In FIG. 13, spindle shaft 22 and cylinder block 46 remain stationary while cam ring 50 rotates in a counterclockwise direction as depicted by rotational arrows 76. As mentioned above, the rotation of cam ring 50 also results in the rotation of wheel hub assembly 58 and the ground engaging wheel (not shown) affixed to wheel mounting studs 66. The radially inner surface 78 of cam ring 50 includes a series of sloped camming surfaces 80. When inner surface 78 is engaged with rolling cam members 56, camming pistons 48 reciprocate within bores 54 as rolling cam members 56 travel across sloped camming surfaces 80.

Valve assembly 44 is in fluid communication with hydraulic passages in spindle shaft 22 and controls the flow of high pressure hydraulic fluid to bores 54 and the return of low pressure hydraulic fluid from bores 54. Passageway 82 in spindle body 20 communicates relatively high pressure hydraulic fluid to valve assembly 44. In FIG. 13, this high pressure hydraulic fluid is being communicated to bore 54a by valve assembly 44 thereby forcing piston 48a and rolling cam member 56a radially outward. Because cylinder block 46 does not rotate about central axis 24, the outward movement of rolling cam member 56a against sloping cam surface 80a causes cam ring 50 to rotate in direction 76.

As high pressure hydraulic fluid is forcing piston 48a radially outward and thereby driving the rotation of cam ring 50, piston 48b and rolling cam member 56b on the opposite side of cam ring 50 are moving radially inward toward central axis 24 due to cam slope 80b. The radially inward motion of piston 48b discharges relatively low pressure hydraulic fluid from bore 54b. Valve assembly 44 communicates this return flow of hydraulic fluid to passageway 84 in spindle body 20. The remaining pistons 48 operate in a similar manner as the rolling cam members 56 associated with these pistons encounter sloped camming surfaces 80.

When hydraulic motor 42 is operating and powering the rotation of cam ring 50, rolling cam members 56 will be in contact with inner cam ring surface 78 as described above with reference to FIG. 13. It is sometimes desirable to have the ground engaging wheel secured to wheel hub assembly 58 rotate freely without having hydraulic motor assembly 42 powering the rotation of cam ring 50. During such periods of free wheel rotation, pistons 48 are retracted so that rolling cam members 56 do not interfere with the rotation of cam ring 50.

Figure 8:
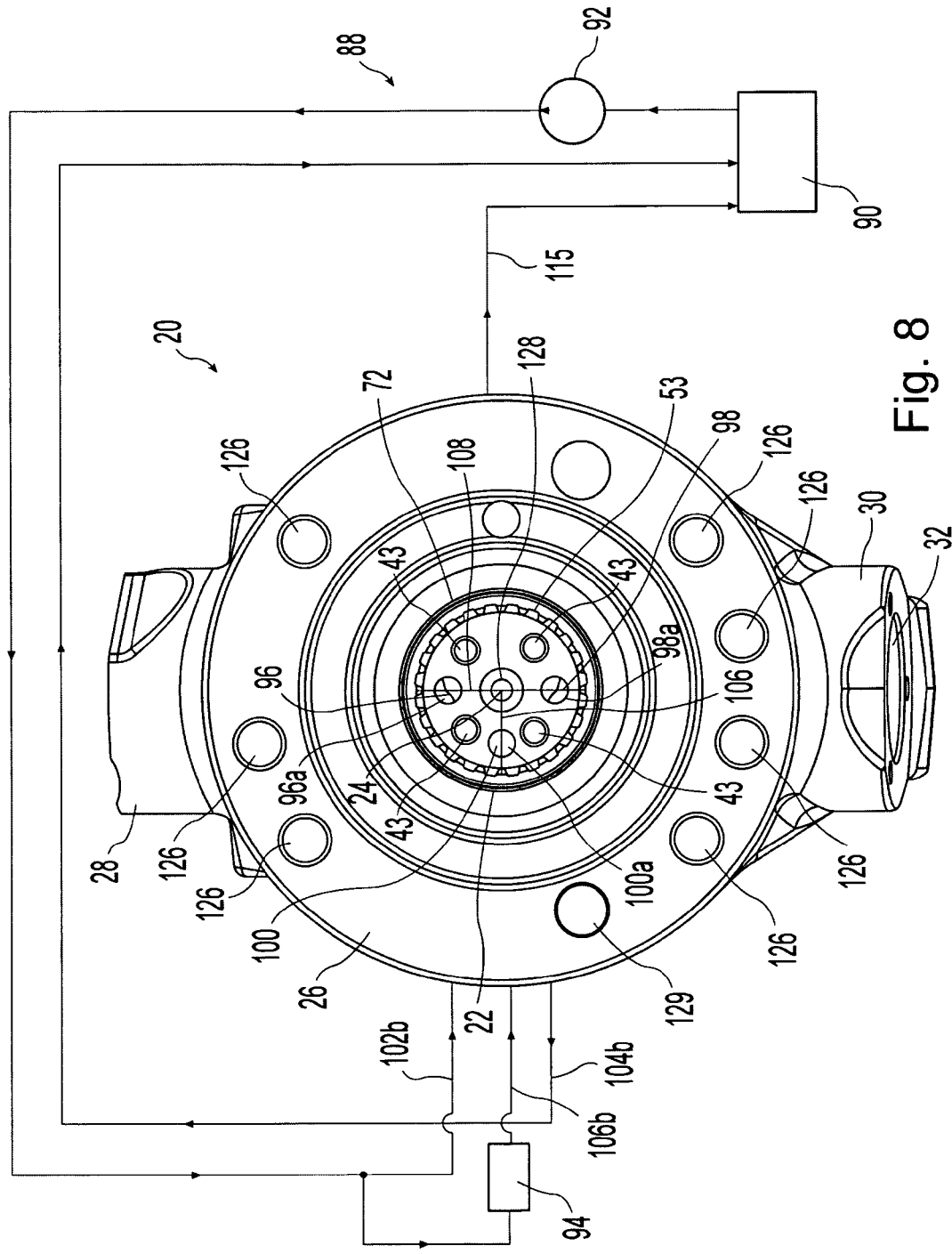
FIG. 8 is a front schematic view of the spindle body and hydraulic system.
Figure 9:
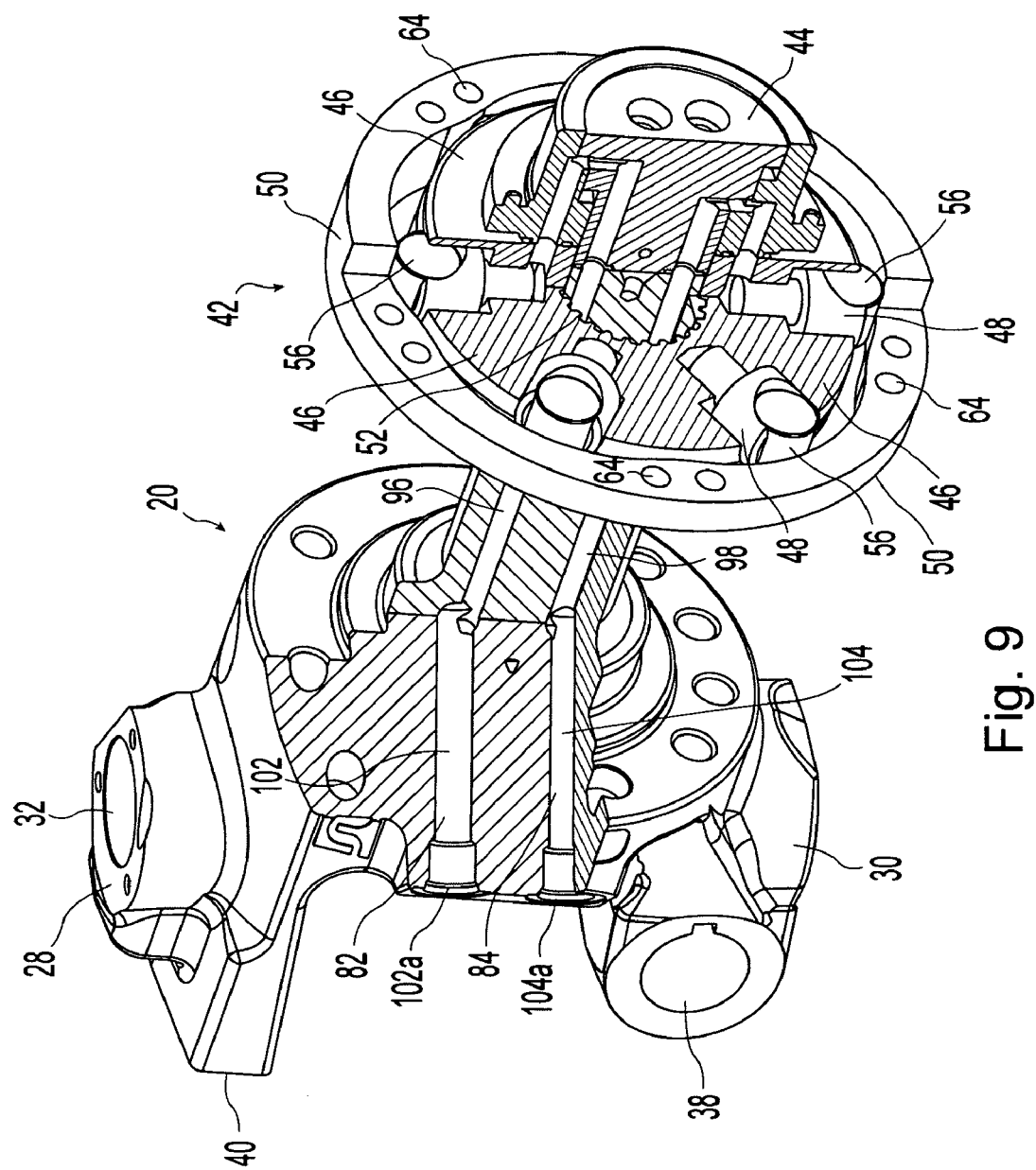
FIG. 9 is a cut-away perspective view of the spindle body and hydraulic motor assembly.

Retraction of pistons 48 is accomplished by reducing the flow and pressure of the hydraulic oil driving motor 42 while maintaining a slightly greater pressure on the oil within hub 60 and the motor case by way of passage 86. Camming ring 50 forms a part of the motor case and regulating the pressure of oil conveyed through passage 86 regulates, in turn, the pressure of the oil located between inner surface 78 of camming ring 50 and cylinder block 46. When free-wheeling, the pressure of the oil located between camming ring 50 and cylinder block 46 is regulated to maintain the pressure at a value that keeps pistons 48 retracted and simultaneously replaces the volume of oil seeping from motor assembly 42. It is generally desirable that this oil pressure be at the minimum pressure necessary to accomplish both the retraction of pistons 48 and replacement of the seepage oil. The motor seepage oil lubricates bearings 68 and is returned to the lowest pressure point in the system, namely, to the hydraulic pump in a closed loop system or, as shown in FIG. 8, to the reservoir 90 via line 115 in an open loop system.

As mentioned above, hydraulic fluid is communicated to and from hydraulic motor assembly 42 through three hydraulic passages 82, 84, 86 that extend within spindle body 20. Passage 82 communicates relatively high pressure hydraulic fluid from hydraulic system 88 to hydraulic motor assembly 42 for driving motor assembly 42. Passage 84 returns relatively low pressure hydraulic fluid to hydraulic system 88. Passage 86 communicates regulated and relatively low pressure hydraulic fluid to the interior cavity of hub 60 and the motor case. Passage 86 feeds oil to the space between camming ring 50 and cylinder 46 for disengaging rolling cam members 56 from cam ring 50 during free-wheeling, limiting pressure within hub 60, and maintaining the flow of lubrication oil to bearings 68 during free-wheeling.

A wide variety of differently configured hydraulic systems 88 can be used with the illustrated spindle body 20 and hydraulic motor assembly 42. One example of such a hydraulic system 88 is schematically depicted in FIG. 8. The illustrated hydraulic system 88 is a relatively simple system that includes a reservoir 90, pump 92 and a pressure reducing valve 94. The depicted hydraulic system 88 is an "open loop" hydraulic system wherein the hydraulic oil is drawn from and returns to a reservoir. The illustrated spindle body and motor assembly 42, however, can also be used with hydrostatic systems wherein the hydraulic oil returns directly to the pump in a "closed loop." In the simplified system 88 illustrated in FIG. 8, hydraulic line 102b provides high pressure fluid to passage 82 from pump 92, line 104b returns fluid from passage 84 to reservoir 90, line 106b provides fluid at a regulated pressure to passage 86 from valve 94 or other suitable pressure regulating components and line 115 returns lubricating fluid to reservoir 90. Maintaining a continuous flow of lubricating fluid through line 115 facilitates the cooling of motor 42 and bearings 68.

Hydraulic motor assembly 42 is capable of operating in both rotational direction 76 and the opposite rotational direction. To operate motor 42 in the rotational direction opposite of arrows 76, hydraulic pressure can be applied at port 104a and port 102a can be used to return low pressure hydraulic fluid to the hydraulic pump. Appropriate modifications to hydraulic system 88 would allow for the selective operation of motor 42 in either rotational direction.

The arrangement of hydraulic passages 82, 84, 86 within spindle body 20 facilitates the efficient manufacture of spindle body 20. Each of the passages 82, 84, 86 includes an axially extending section 96, 98, 100 and a laterally extending section 102, 104, 106. The axially extending sections 96, 98, 100 each define a centerline 97, 99, 101 that extends parallel with central axis 24. Axial sections 96, 98, 100 each define a port 96a, 98a, 100a on the distal end of spindle shaft 22. Ports 96a, 98a, 100a are in fluid communication with valve assembly 44.

Laterally extending sections 102, 104, 106 each have a first end in fluid communication with a corresponding one of the axially extending sections 96, 98, 100 and an opposite second end defining a port 102a, 104a, 106a on an outer surface 21 of spindle body 20. Thus, hydraulic passage 82 provides fluid communication between port 102a and port 96a, hydraulic passage 84 provides fluid communication between port 104a and port 98a, and hydraulic passage 86 provides fluid communication between port 106a and port 100a.

Figure 15:
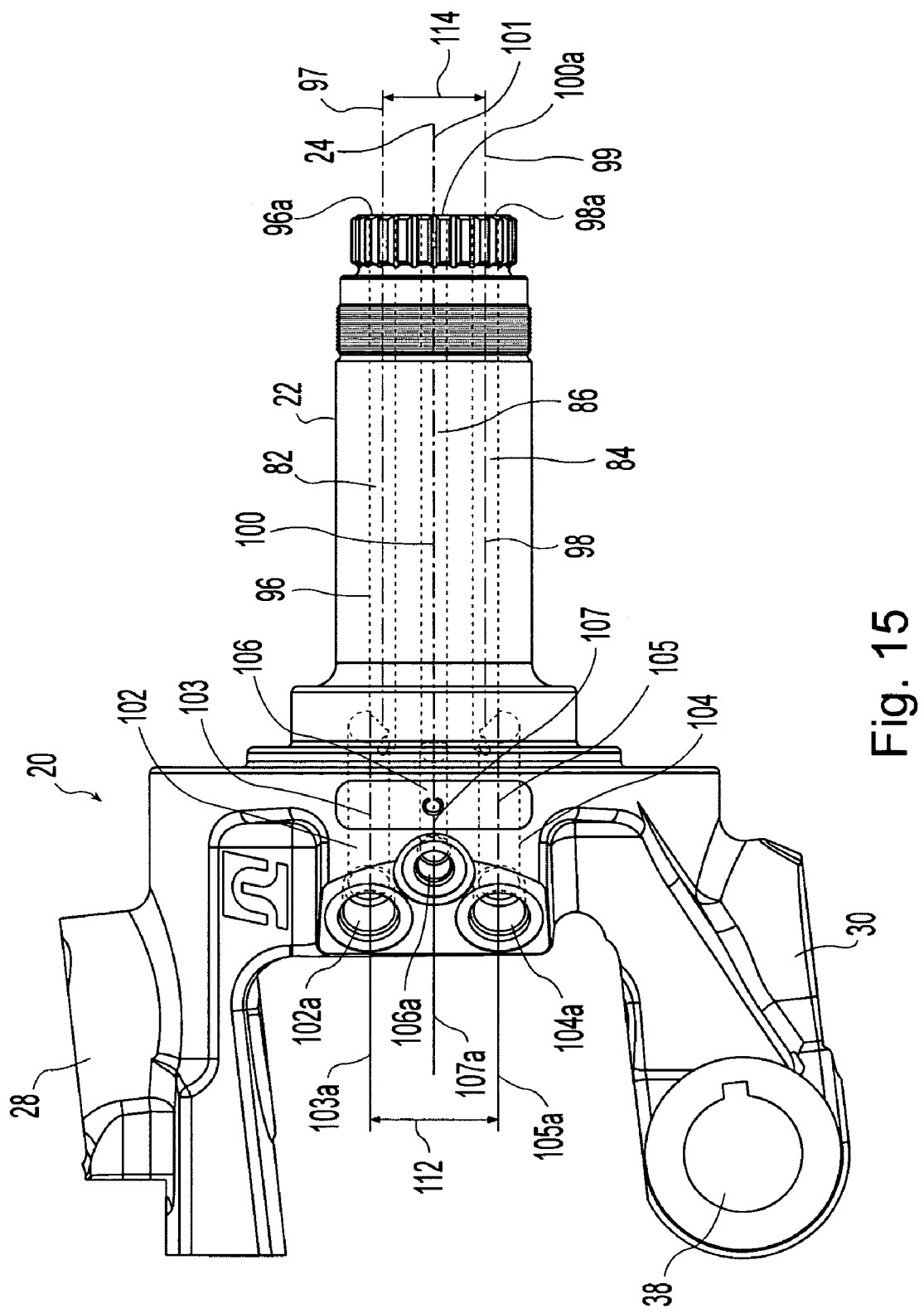
FIG. 15 is a side view of the spindle body showing the hydraulic passages.

Laterally extending sections 102, 104, 106 each define a centerline 103, 105, 107. Passages 82, 84, 86 are configured such that centerlines 103, 105, 107 of the laterally extending sections 102, 104, 106 are positioned in mutually parallel planes 103a, 105a, 107a. Centerlines 97, 99, 101 of axially extending sections 96, 98, 100 together with central axis 24 are all parallel with each of the mutually parallel planes 103a, 105a, 107a. The edge of planes 103a, 105a, 107a are shown in FIG. 15. Or, stated differently, each of the mutually parallel planes 103a, 105a, 107a is positioned extending into the sheet of FIG. 15 such that only the edges of planes 103a, 105a, 107a, depicted as lines, are visible. In the illustrated embodiment, when central axis 24 is positioned in a horizontal plane, each of the axially extending centerlines 97, 99, 101 will be positioned in a horizontal plane and each of the mutually parallel planes 103a, 105a, 107a will form horizontal planes.

It should be recognized that any line defines an infinite number of planes including centerlines 103, 105, 107. The preceding discussion of planes 103a, 105a, 107a does not mean that all of the planes defined by centerlines 103, 105, 107 are both mutually parallel and parallel with centerlines 97, 99, 101 and central axis 24. Instead, it is only one set of such planes that satisfy these conditions.

As seen in FIGS. 8 and 16, axially extending sections 96, 98, 100 are positioned at a common radial distance from central axis 24. As can also be seen, axial sections 98, 100 and 96 are at 90 degree angular intervals about central axis 24. In other words, centerlines 97, 99 are positioned on opposite sides of center axis 24 on a plane 108 extending diametrically through central axis 24 and centerline 101 is positioned on a radial plane 110 that extends from central axis 24 at a perpendicular angle relative to plane 108.

Spindle body 20 can be manufactured using various conventional manufacturing methods. The parallel orientation of laterally extending sections 102, 104, 106 in addition to the orientation of axially extending sections 96, 98, 100 facilitates the efficient manufacture of spindle body 20. The illustrated spindle body 20 is formed by forging although other methods, such as casting, could also be used to form metal body 20. The forged metal body is then machined to give spindle body 20 its desired configuration.

During the machining of spindle body 20, axially extending sections 96, 98, 100 and laterally extending sections 102, 104, 106 will be drilled in spindle body 20 to form hydraulic passages 82, 84, 86. Centering holes 128 located on opposite ends of central axis 24 are used to secure spindle body 20 when performing the machining operations. A hole 129 (FIG. 8) for receiving a locating pin is also employed to properly position spindle body 20 during the machining operations.

Figures 5, 6, 7:
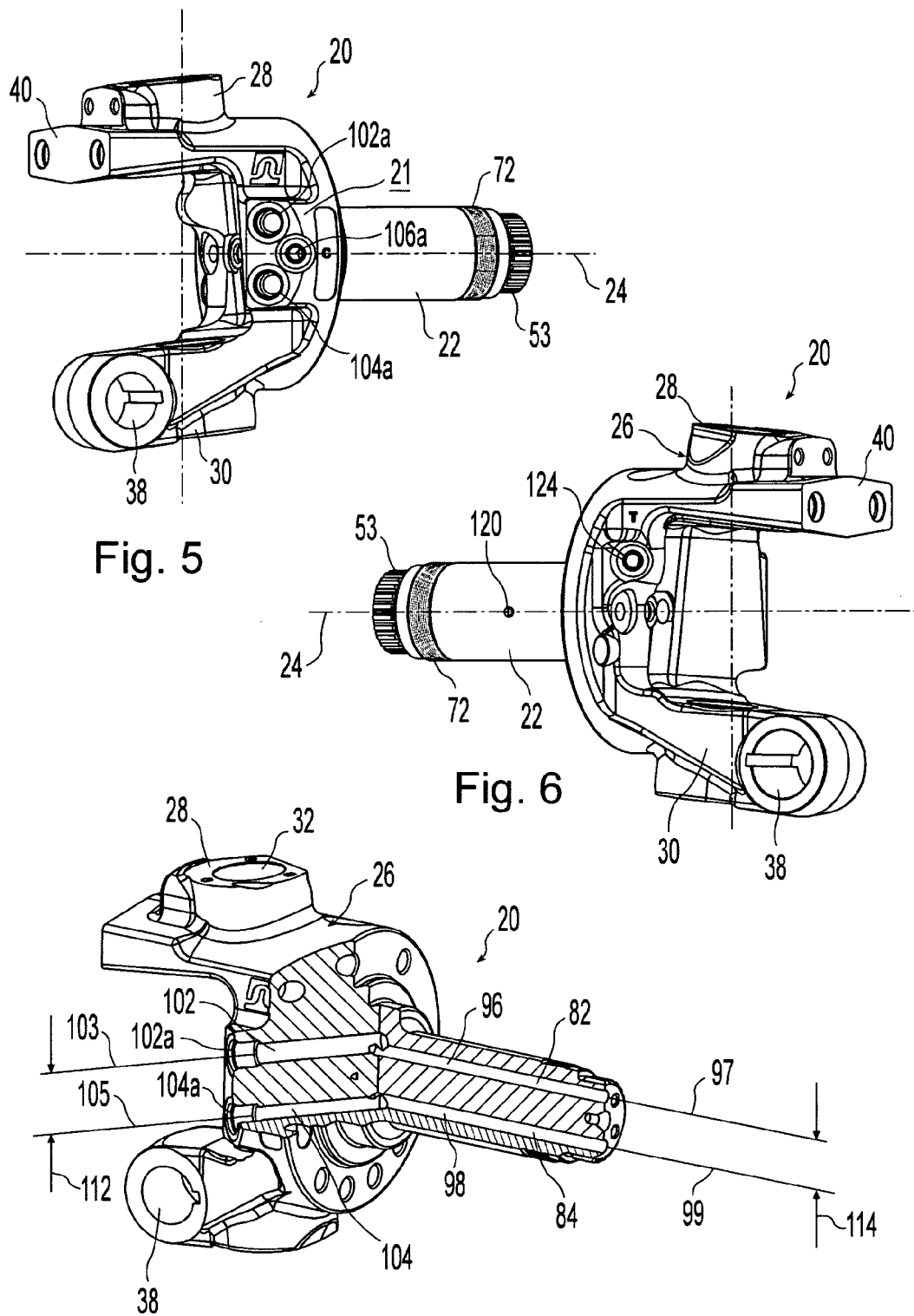
FIG. 5 is a perspective view of the spindle body.
FIG. 6 is a perspective view of the spindle body.
FIG. 7 is a cut-away perspective view of the spindle body.

Another aspect of spindle body 20 facilitates the installation of hydraulic fixtures on spindle body 20. Hydraulic passages 82, 84, 86 are positioned to enhance the space available for attaching hydraulic hoses by installing hydraulic nipples or other suitable fixtures in ports 102a, 104a, 106a. Passages 82, 84 are configured such that centerlines 103, 105 of laterally extending sections 102, 104 are parallel with each other and spaced apart by a distance 112. Centerlines 97, 99 of axially extending sections 96, 98, however, are spaced apart by a distance 114 that is smaller than distance 112 (FIGS. 7 and 15). Although centerlines 103 and 97 of passage 82 are offset, lateral section 102 and axial section 96 still intersect to communicate hydraulic fluid between ports 102a and 96a. Similarly, although centerlines 105 and 99 of passage 84 are offset, lateral section 104 and axial section 98 still intersect and communicate hydraulic fluid between ports 98a and 104a.

As can be seen in FIG. 17, centerlines 103 and 105 are parallel with each other, however, centerline 107 of laterally extending section 106 extends in a non-parallel direction relative to centerlines 103, 105. This offset arrangement of lateral section 106 increases the spacing between port 106a and ports 102a and 104a. Also unlike the other two passages 82, 84, the third hydraulic passage 86 which is positioned between passages 82, 84 has a lateral section 106 and an axial section 100 which have centerlines 107, 101 that do intersect and lie in the same plane as central axis 24.

Another difference between passages 82, 84 and passage 86 relates to the cross sectional area of the lateral and axial extending sections of these passages. Each of the individual axial sections 96, 98 of passages 82, 84 has a cross sectional area that is smaller than the cross sectional area of the lateral section 102, 104 with which it is in fluid communication. Axial section 100 of passage 86, however, has the same cross sectional area as lateral section 106.

Figure 14:
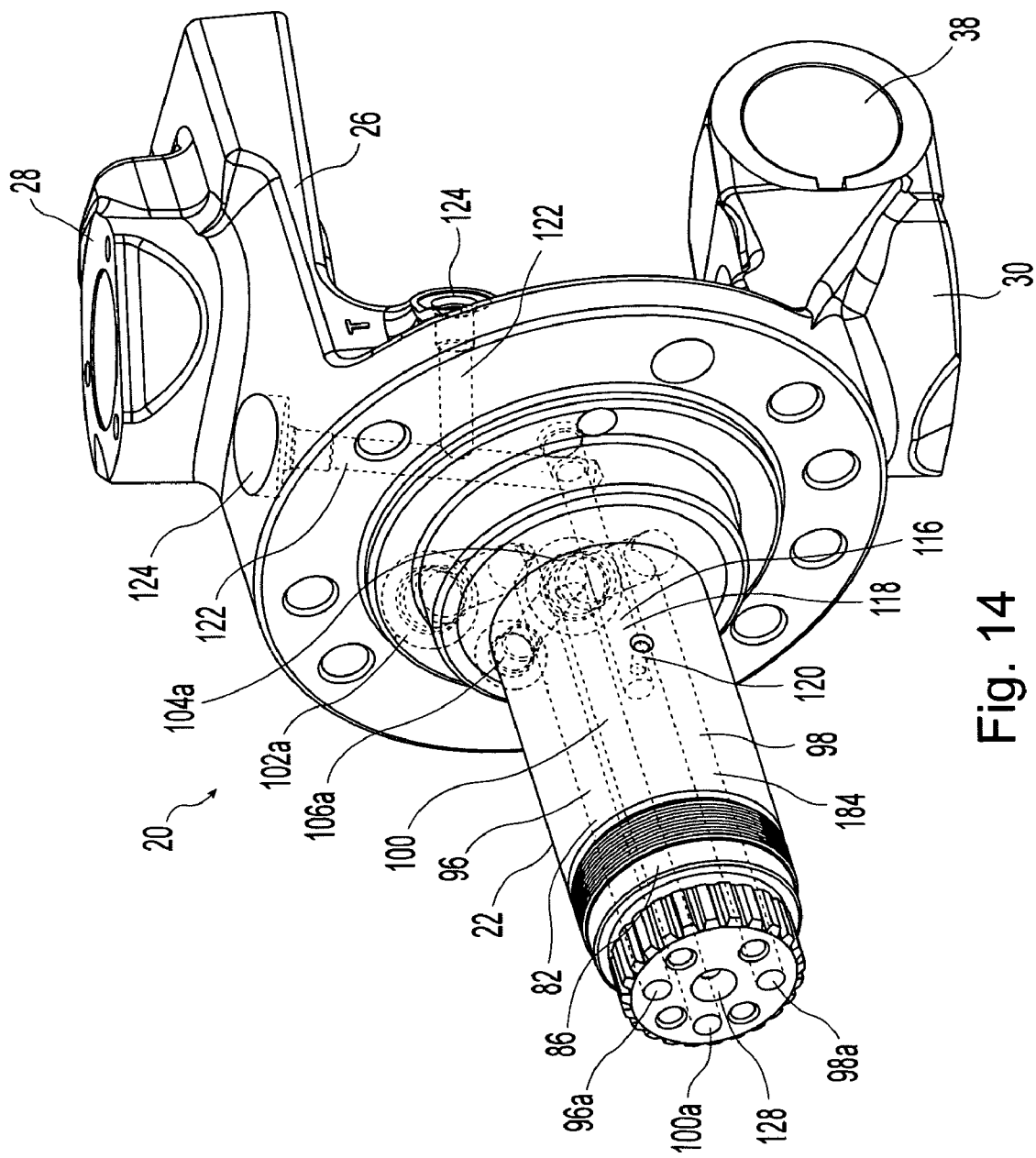
FIG. 14 is a perspective view of the spindle body showing the hydraulic passages.

As can be seen in FIGS. 14 and 16, a lubrication fluid communication passage 116 extends through spindle body 20 proximate bearing assembly 68 for the communication of lubricating fluid. Lubrication passage 116 has an axially extending section 118 that is arranged parallel with central axis 24 opposite passage 86. A passage 120 is provided to allow lubrication fluid to be drained from bearing assembly 68. Secondary passages 122 allow excess lubrication fluid to return to reservoir 90 through ports 124. Plugs can be used to block the flow of fluid through selected ports 124 and limit return flow to one of the ports 124.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus comprising:
a spindle body defining a central axis;
a hydraulic motor assembly operably mounted on said spindle, at least a portion of said hydraulic motor assembly being rotatable relative to said spindle body about said central axis; and
a plurality of hydraulic passages extending within said spindle body, each of said plurality of passages including an axial section and a lateral section wherein each of said axial sections is in fluid communication with the hydraulic motor assembly and defines a first centerline extending substantially parallel with said central axis and wherein each of said lateral sections has a first end in fluid communication with a corresponding one of said axial sections and an opposite second end defining a port on an outer surface of said spindle body and wherein each of said lateral sections defines a second centerline; said second centerlines being positioned in mutually parallel planes wherein each of said first centerlines and said central axis are substantially parallel with each of said mutually parallel planes.

2. The apparatus of claim 1 wherein said plurality of hydraulic passages includes a first passage and a second passage wherein said second centerlines defined by said first passage and said second passage are substantially parallel.

3. The apparatus of claim 1 wherein said plurality of hydraulic passages includes a first passage and a second passage wherein said axial sections of each of said first and second passages defines a first cross sectional area and said lateral sections of each of said first and second passages defines a second cross sectional area and said second cross sectional area is larger than said first cross sectional area for each of said first and second passages; and
said first centerlines of said first and second passages are spaced apart by a first distance and said second centerlines of said first and second passages are spaced apart by a second distance, said second distance being greater than said first distance.

4. The apparatus of claim 3 wherein said plurality of hydraulic passages includes a third passage wherein said first center line of said third passage is positioned at distance less than said first distance from each of said first centerlines of said first and second passages and wherein said second center line of said third passage is positioned at a distance less than said second distance from each of said second centerlines of said first and second passages.

5. The apparatus of claim 1 wherein said plurality of hydraulic passages includes a first passage and a second passage, said first centerlines of said first and second passages being positioned on opposite sides of said central axis proximate a first plane extending diametrically through said central axis; said plurality of hydraulic passages further comprising a third passage wherein said first centerline of said third passage is positioned on a second plane extending radially from said central axis, said second plane extending at a substantially perpendicular angle with respect to said first plane.

6. The apparatus of claim 5 wherein said axial sections of each of said first and second passages defines a first cross sectional area and said lateral sections of each of said first and second passages defines a second cross sectional area and said second cross sectional area is larger than said first cross sectional area for each of said first and second passages; and
said first centerlines of said first and second passages are spaced apart by a first distance and said second centerlines of said first and second passages are spaced apart by a second distance, said second distance being greater than said first distance.

7. The apparatus of claim 6 wherein said second centerlines defined by said first passage and said second passage are substantially parallel and said second centerline defined by said third passage extends in a non-parallel direction with respect to said second centerlines of said first and second passages.

8. The apparatus of claim 1 wherein said spindle body further defines a lubrication fluid communication passage.

9. The apparatus of claim 1 further comprising a wheel hub mounted on said hydraulic motor assembly and wherein said spindle body further comprises a knuckle portion adapted to rotatably receive a kingpin.

10. A method of manufacture, said method comprising:
providing a spindle body wherein the spindle body defines a central axis and is adapted to support a hydraulic motor thereon;
forming a plurality of axially extending hydraulic passage sections in the spindle body wherein each of the axially extending sections defines a first centerline that is substantially parallel with the central axis;
forming a corresponding plurality of laterally extending hydraulic passage sections, each of the laterally extending sections having one end defining a port on an external surface of the spindle body and an opposite end in fluid communication with one of the axially extending sections wherein each of the second laterally extending sections defines a second centerline wherein the second centerlines are positioned in mutually parallel planes wherein the first centerlines and the central axis are substantially parallel with each of the mutually parallel planes.

11. The method of claim 10 wherein the plurality of hydraulic passages includes a first passage and a second passage and the second centerlines defined by the first and second passages are substantially parallel.

12. The method of claim 10 wherein the plurality of hydraulic passages includes a first passage and a second passage wherein the axially extending sections of each of the first and second passages defines a first cross sectional area and the laterally extending sections of each of the first and second passages defines a second cross sectional area and the second cross sectional area is larger than the first cross sectional area for each of the first and second passages; and
the first centerlines of the first and second passages are spaced apart by a first distance and the second centerlines of the first and second passages are spaced apart by a second distance, the second distance being greater than the first distance.

13. The method of claim 12 wherein the plurality of hydraulic passages includes a third passage wherein the first center line of the third passage is positioned at distance less than the first distance from each of the first centerlines of the first and second passages and wherein the second center line of the third passage is positioned at a distance less than the second distance from each of the second centerlines of the first and second passages.

14. The method of claim 10 wherein the plurality of hydraulic passages includes a first passage and a second passage, the first centerlines of said first and second passages being positioned on opposite sides of the central axis proximate a first plane extending diametrically through the central axis; the plurality of hydraulic passages further comprising a third passage wherein the first centerline of the third passage is positioned on a second plane extending radially from the central axis, the second plane extending at a substantially perpendicular angle with respect to the first plane.

15. The method of claim 14 wherein the axially extending sections of each of the first and second passages defines a first cross sectional area and the laterally extending sections of each of the first and second passages defines a second cross sectional area and the second cross sectional area is larger than the first cross sectional area for each of the first and second passages; and the first centerlines of the first and second passages are spaced apart by a first distance and the second centerlines of the first and second passages are spaced apart by a second distance, the second distance being greater than the first distance.

16. The method of claim 15 wherein the second centerlines defined by the first passage and the second passage are substantially parallel and the second centerline defined by the third passage extends in a non-parallel direction with respect to the second centerlines of the first and second passages.

17. The method of claim 10 further comprising the step of mounting a hydraulic motor assembly on the spindle body wherein the plurality of axially extending hydraulic sections are in fluid communication with the hydraulic motor assembly.

18. The method of claim 17 further comprising the step of mounting a wheel hub on the hydraulic motor assembly.

19. The method of claim 18 further comprising the step of providing the spindle body with a knuckle portion adapted to rotatably receive a kingpin.

20. The method of claim 19 further comprising the step of forming a lubrication fluid communication passage in the spindle body.

* * * * *